(12) United States Patent
Milette et al.

(10) Patent No.: US 7,887,244 B2
(45) Date of Patent: Feb. 15, 2011

(54) REVERSIBLE FIBER CONNECTOR WITH MECHANICAL SPLICE AND SLIDING LOCK

(75) Inventors: Luc Milette, Montreal (CA); Moise Levy, Laval (CA)

(73) Assignee: Belden CDT (Canada) Inc., Saint-Laurent (CA)

( * ) Notice: Subject to any disclaimer, the term of this patent is extended or adjusted under 35 U.S.C. 154(b) by 53 days.

(21) Appl. No.: 12/484,614

(22) Filed: Jun. 15, 2009

(65) Prior Publication Data

US 2009/0310918 A1 Dec. 17, 2009

Related U.S. Application Data

(60) Provisional application No. 61/061,295, filed on Jun. 13, 2008.

(51) Int. Cl.
*G02B 6/36* (2006.01)
(52) U.S. Cl. .............................. 385/76; 385/78; 385/81; 385/83; 385/84
(58) Field of Classification Search ............. 385/65–67, 385/70, 72, 76, 77, 78, 81, 83, 84, 87
See application file for complete search history.

(56) References Cited

U.S. PATENT DOCUMENTS

| | | | |
|---|---|---|---|
| 4,435,038 A | 3/1984 | Soes et al. | |
| 4,669,820 A | 6/1987 | Ten Berge | |
| 5,138,681 A | 8/1992 | Larson et al. | |
| 5,341,448 A | 8/1994 | Huebscher | |
| 5,394,496 A | 2/1995 | Caldwell et al. | |
| 5,984,532 A | 11/1999 | Tamaki et al. | |
| 6,179,482 B1 | 1/2001 | Takizawa et al. | |
| 6,379,054 B2 | 4/2002 | Throckmorton et al. | |
| 6,604,867 B2 | 8/2003 | Radek et al. | |
| 7,001,084 B2 | 2/2006 | Carpenter et al. | |
| 7,014,372 B2 | 3/2006 | Watte et al. | |
| 7,178,990 B2 | 2/2007 | Caveney et al. | |
| 7,241,056 B1 | 7/2007 | Kuffel et al. | |
| 7,258,496 B2 | 8/2007 | Saito et al. | |
| 7,264,410 B1 | 9/2007 | Doss et al. | |
| 7,280,733 B2 | 10/2007 | Larson et al. | |
| 7,346,256 B2 | 3/2008 | Marrs et al. | |
| 2006/0153515 A1 | 7/2006 | Honma et al. | |
| 2007/0127873 A1* | 6/2007 | Manning et al. | 385/81 |
| 2008/0075407 A1 | 3/2008 | Saito et al. | |

\* cited by examiner

*Primary Examiner*—Uyen-Chau N Le
*Assistant Examiner*—Chris H Chu
(74) *Attorney, Agent, or Firm*—Goudreau Gage Dubuc; Hugh Mansfield

(57) ABSTRACT

A connector assembly for reversibly terminating an optical fiber comprises a housing having a cavity extending along a longitudinal axis. An elongate member having a groove extending along a surface thereof is provided within the cavity. An end portion of the fiber is aligned with a fiber stub within the groove such that the stub's splicing face is positioned opposite the fiber's splicing face. A splice anvil is positioned adjacent the member's surface with the anvil's clamping surface overlapping the abutting stub and fiber splicing faces. The clamping mechanism comprises an actuator slideably mounted about the member for movement between a released position and a clamping position in which the inner surface of the actuator displaces the anvil in a direction perpendicular to the longitudinal axis and towards the member's surface, the anvil's clamping surface thus bringing a clamping force to bear on the abutting fiber and fiber stub.

18 Claims, 5 Drawing Sheets

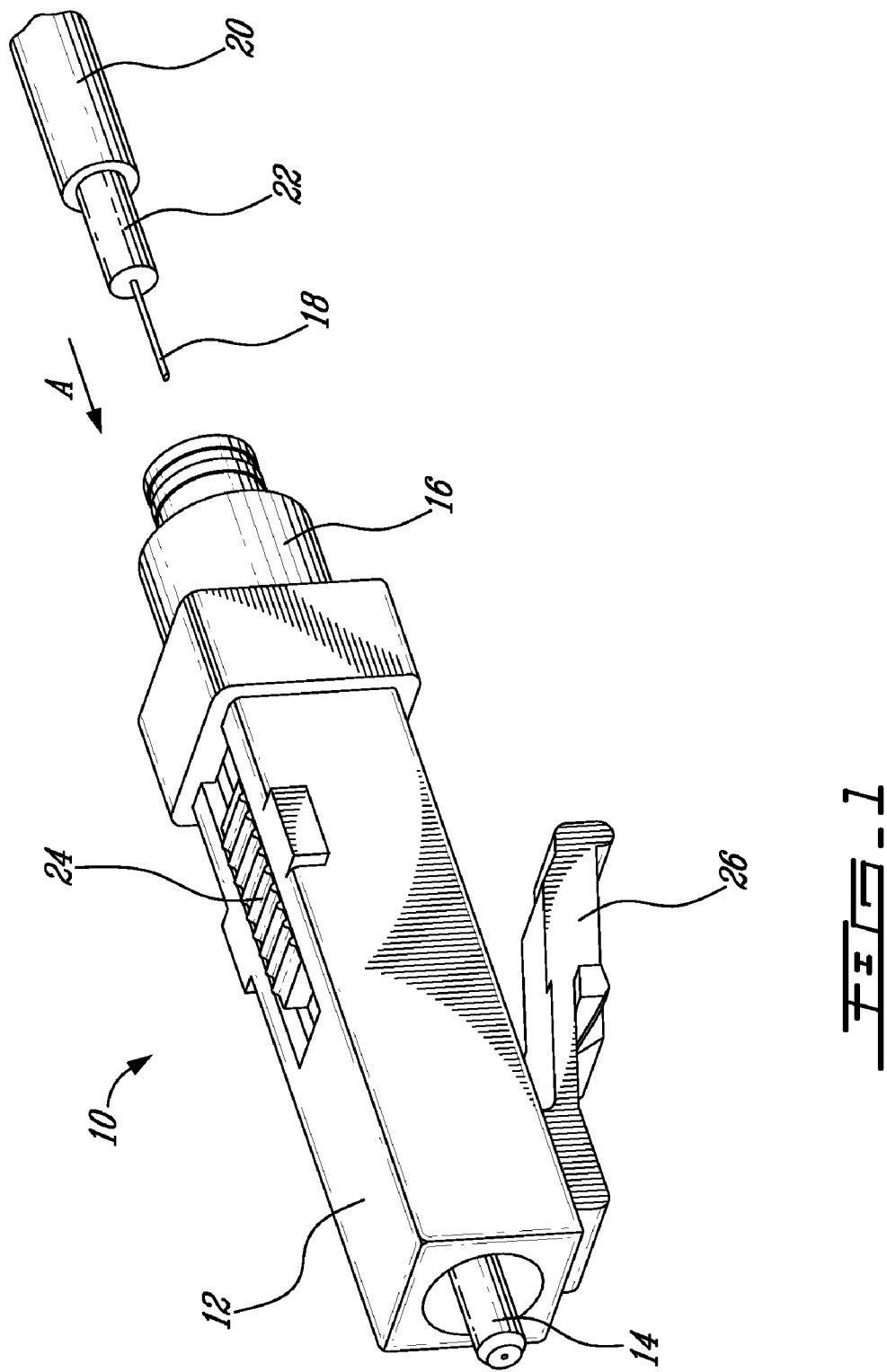

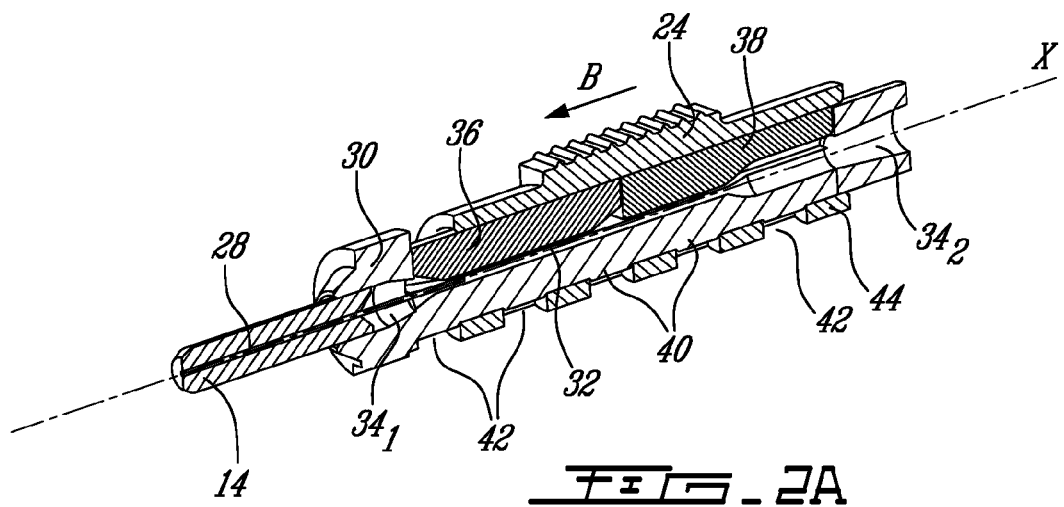
FIG_2A
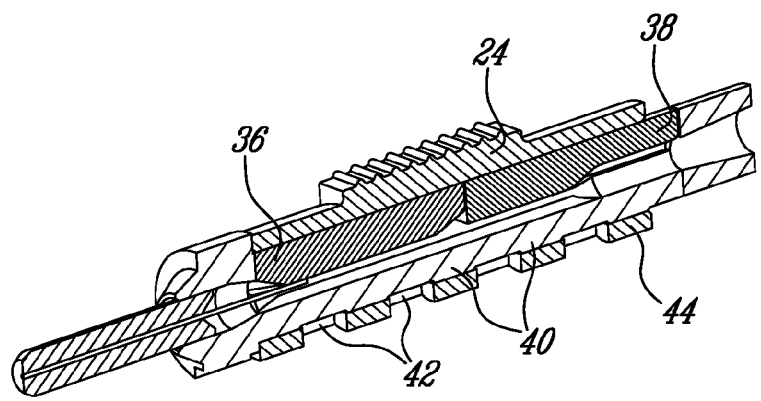
FIG_2B

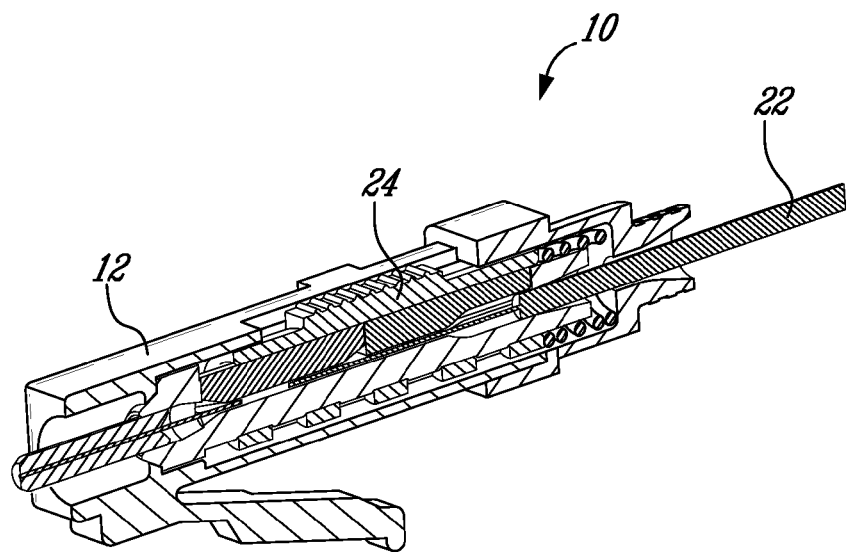
FIG_3A
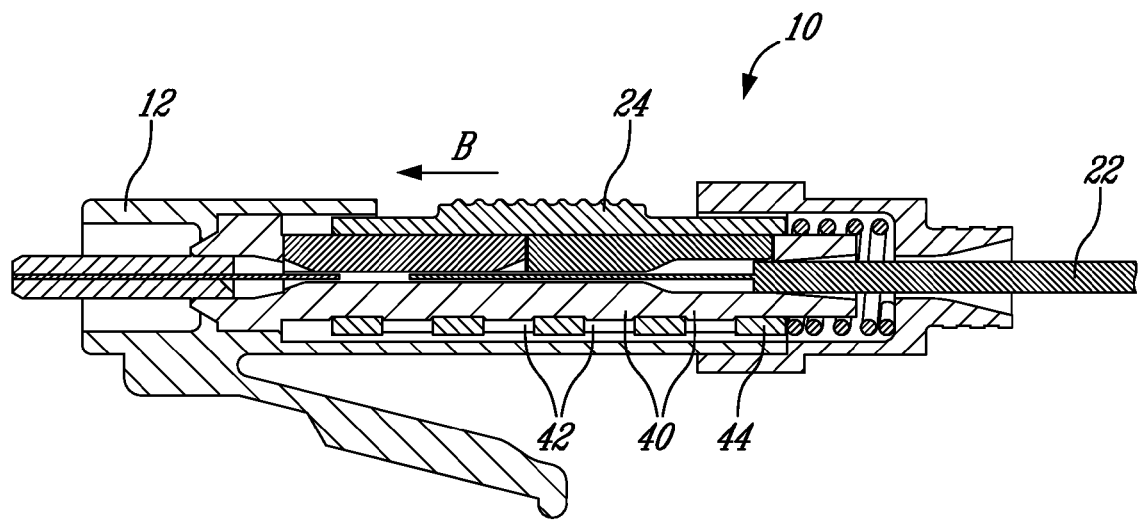
FIG_3B

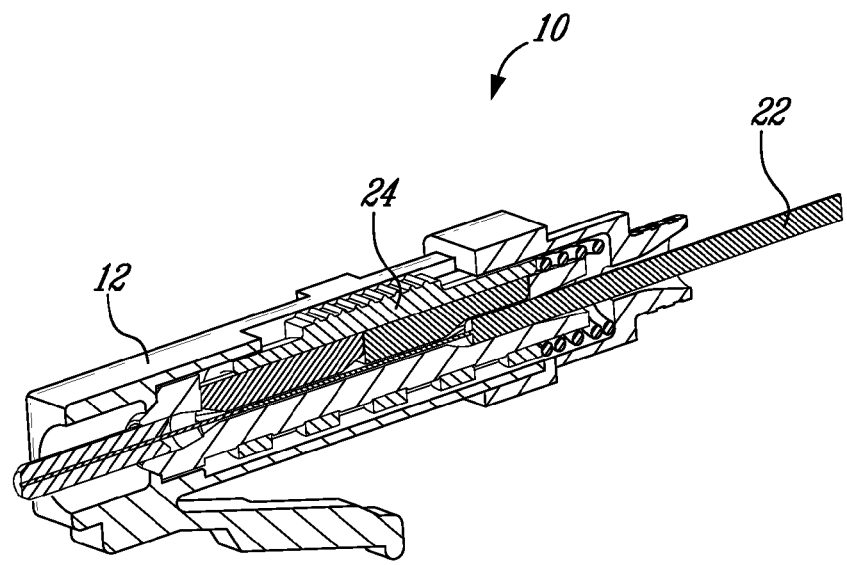
FIG_4A
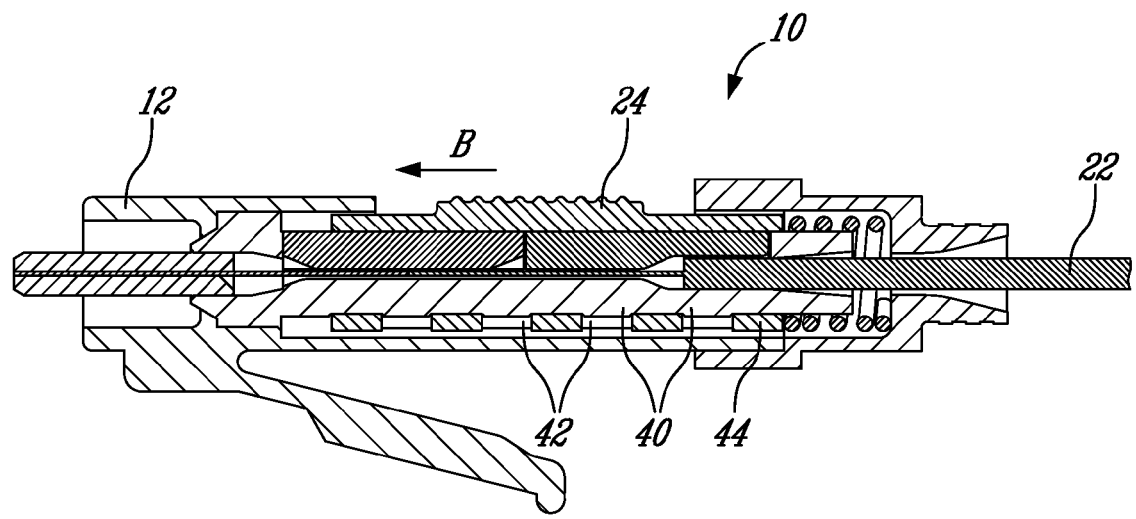
FIG_4B

REVERSIBLE FIBER CONNECTOR WITH MECHANICAL SPLICE AND SLIDING LOCK

CROSS REFERENCE TO RELATED APPLICATIONS

This application claims priority on U.S. Provisional Application No. 61/061,295, filed on Jun. 13, 2008 and which is herein incorporated by reference in its entirety.

FIELD OF THE INVENTION

The present invention relates to a reversible fiber connector with mechanical splice and sliding lock for aligning and retaining an optical fiber stub and an adjoining field optical fiber.

BACKGROUND OF THE INVENTION

Fiber optic systems are well-known for their difficult terminations. In particular, alignment of mating optical fibers within a fiber optic connector is critical to the connector's performance. To accurately align an optical fiber stub of a connector with a mating field optical fiber inserted into the connector, a biasing force is typically applied to at least one mechanical splice component comprised within the connector. In this manner, the optical fiber stub and the field optical fiber are both retained between opposing splice components, which are biased together by an actuator. Once the optical fibers are aligned and retained in optical continuity, the field optical fiber is then strain relieved to the connector by crimping a buffered portion of the field fiber.

Prior art connectors are however complex as fiber alignment and strain relief are typically performed in more than one step using more than one element of the connector, thus requiring additional materials and proving time and cost consuming. Another drawback is that the termination assembly is typically non-reusable since once the optical fibers have been strain relieved by applying a crimp, it is usually not possible to reverse the splice without destroying the connector assembly or damaging the optical fiber. Indeed, the crimping operation has the tendency to pull the field fiber and fiber stub apart or damage the signal-passing function of the interface. Also, although some connectors use a reusable termination system, such connectors generally require a specific activation tool dedicated to each type of system.

What is therefore needed, and an object of the present invention, is an easy to use fiber optic connector that reversibly and nondestructively terminates a field fiber inserted therein.

SUMMARY OF THE INVENTION

More specifically, in accordance with the present invention, there is provided a connector assembly for reversibly terminating an optical fiber, the assembly comprising an elongate housing comprising a front end, a rear end and a cavity extending therebetween along a longitudinal axis. The assembly further comprises an elongate member mounted within the cavity and comprising a first end, a second end and an alignment groove extending along a first surface thereof between the first end and the second end. An end portion of the optical fiber is positioned within the groove and extends from the second end and an optical fiber splicing face of the optical fiber is positioned between the first end and the second end. The assembly also comprises an optical fiber stub positioned within the groove and extending from the first end, a stub splicing face of the optical fiber stub being positioned opposite the optical fiber splicing face. A splice anvil is positioned adjacent the first surface, a clamping surface of the anvil overlapping the stub splicing face and the optical fiber splicing face. The assembly further comprises a clamping mechanism comprising a plurality of spaced projections arranged along a second surface of the elongate member opposite the first surface and an actuator slideably mounted about the elongate member for movement between a released position and a clamping position. The actuator comprises an inner surface abutting the anvil and a plurality of spaced ribs. When in the released position each of the ribs is positioned in a corresponding slot between a respective pair of the projections and when the actuator is moved from the released position to the clamped position each of the ribs is moved out of the corresponding slot and positioned opposite a corresponding one of the projections. The movement gives rise to a corresponding movement of the inner surface, the inner surface displacing the anvil in a direction perpendicular to the longitudinal axis and towards the first surface, and a clamping surface of the anvil bringing a corresponding clamping force to bear on the optical fiber stub and the optical fiber.

In accordance with the present invention, there is also provided a method for reversibly terminating an optical fiber to an optical fiber stub. The method comprises providing a connector assembly comprising an elongate housing comprising a front end, a rear end and a cavity extending therebetween along a longitudinal axis. The connector assembly further comprises an elongate member mounted within the cavity and comprising a first end, a second end and an alignment groove extending along a first surface thereof between the first end and the second end. The connector assembly also comprises a splice anvil positioned adjacent the first surface and a clamping mechanism comprising a plurality of spaced projections arranged along a second surface of the elongate member opposite the first surface and an actuator slideably mounted about the elongate member for movement between a released position and a clamping position. The actuator comprises an inner surface abutting the anvil and a plurality of spaced ribs. When in the released position each of the ribs is positioned in a corresponding slot between a respective pair of the projections. The method further comprises positioning an end portion of the optical fiber within the groove, the end portion extending from the second end and an optical fiber splicing face of the optical fiber being positioned between the first end and the second end. The method also comprises positioning the optical fiber stub within the groove, the optical fiber stub extending from the first end, a stub splicing face of the optical fiber stub being positioned opposite the optical fiber splicing face, and a clamping surface of the anvil overlapping the stub splicing face and the optical fiber splicing face. The method also comprises moving the actuator from the released position to the clamped position, thereby moving each of the ribs out of the corresponding slot and positioning each of the ribs opposite a corresponding one of the projections. The movement gives rise to a corresponding movement of the inner surface, the inner surface displacing the anvil in a direction perpendicular to the longitudinal axis and towards the first surface. A clamping surface of the anvil brings a corresponding clamping force to bear on the optical fiber stub and the optical fiber.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

FIG. 1 is a perspective view of a reversible fiber connector with mechanical splice and sliding lock in accordance with an illustrative embodiment of the present invention;

FIG. 2A is a sectional perspective view of the reversible fiber connector of FIG. 1 with the sliding lock in a released position in accordance with an illustrative embodiment of the present invention;

FIG. 2B is a sectional perspective view of the reversible fiber connector of FIG. 1 with the sliding lock in a clamping position in accordance with an illustrative embodiment of the present invention;

FIG. 3A is a sectional perspective view of the reversible fiber connector of FIG. 1 with the sliding lock in a released position during insertion of the fiber in accordance with an illustrative embodiment of the present invention;

FIG. 3B is a front side view of the reversible fiber connector of FIG. 3A in accordance with an illustrative embodiment of the present invention;

FIG. 4A is a sectional perspective view of the reversible fiber connector of FIG. 1 with the sliding lock in a released position and the fiber displaced to a final position, in accordance with an illustrative embodiment of the present invention;

FIG. 4B is a front side view of the reversible fiber connector of FIG. 4A in accordance with an illustrative embodiment of the present invention;

DETAILED DESCRIPTION OF THE ILLUSTRATIVE EMBODIMENTS

Figure 5A:
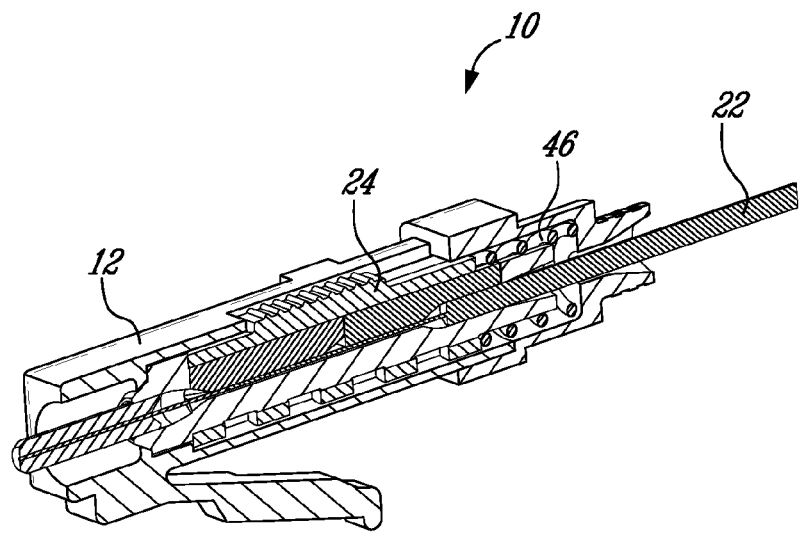
FIG. 5A is a sectional perspective view of the reversible fiber connector of FIG. 1 with the fiber displaced to a final position and the sliding lock moved to a clamping position in accordance with an illustrative embodiment of the present invention.

Referring now to FIG. 1, and in accordance with an illustrative embodiment of the present invention, a reversible fiber connector assembly, generally referred to using the reference numeral 10, will now be described. The connector 10 is illustratively a re-terminable, no-crimp Local Connector (LC)-type optical connector that comprises a housing 12 having a front end, in which a ferrule 14 having affixed thereto an optical fiber stub (not shown) is received. The connector 10 further comprises at a rear end thereof opposite the ferrule 14 a backbone 16 through which a mating optical fiber 18 is inserted into the connector 10 along the direction of arrow A for termination. The optical fiber 18 is illustratively prepared for insertion into the connector 10 by removing a portion of the cable jacket 20 and coated or buffered portion 22 to expose a predetermined length of the bare glass fiber 18. The connector 10 further comprises a clamping mechanism comprising an actuator or sliding lock 24, which when actuated ensures proper mating and alignment of the fiber stub 28 with the optical fiber 18 for accurate termination of the optical fiber 18. A tab 26 is further provided on a lower surface (not shown) of the connector 10 for insertion and retention thereof into an appropriately configured port of a patch panel or other device (both not shown) to permit signals to pass from the optical fiber 18 to the device and vice-versa.

Referring now to FIG. 2A and FIG. 2B, the connector housing (reference 12 in FIG. 1) is illustratively elongate and comprises a cavity (not shown) extending between the front and rear ends along a longitudinal axis X. An elongate ferrule holder 30 is disposed in the housing cavity and surrounds one end of the ferrule 14 and associated fiber stub 28. An alignment groove (V-shaped or "V-groove") 32 is illustratively provided on an inner surface of the ferrule holder 30 and extends between front and rear ends of the ferrule holder 30 along the longitudinal axis X. The groove 32 has at each end thereof a funnel-shaped lead-in portion $34_1$, $34_2$, which provides a smooth transition for the fibers (reference 18 in FIG. 1) and 28 to be routed into the groove 32 from either end of the connector housing 12, thus protecting the end face of the fibers 18, 28 from damage.

Still referring to FIG. 2A and FIG. 2B, the first groove portion $34_1$ is illustratively positioned adjacent the ferrule 14 to facilitate the positioning and centering of the fiber stub 28 inside the ferrule 14 and of a protruding end (not shown) of the fiber stub 28 within the groove 32. For this purpose, the ferrule 14 illustratively comprises an axial bore (not shown), which is aligned with the groove 32 and in which the fiber stub 28 is disposed with the protruding end extending away from the front end of the housing 12. The second groove portion $34_2$ is used to position the buffered portion 22 and accordingly center the fiber 18 within the connector housing 12 along the groove 32 so that an optical fiber splicing face (not shown) of the fiber 18 extends from the rear end of the housing 12 towards the front end to make physical contact with a stub splicing face (not shown) of the fiber stub 28. Illustratively, index-matching gel may be provided in the area of the groove 32 where the fibers 18 and 28 mate to refractively limit signal loss at the interface of the optical fiber 18 and the fiber stub 28 once the latter are properly aligned. Although a V-groove 32 has been shown for illustrative purposes, the alignment groove 32 could have any other shape (e.g. square or "U-groove") suitable for receiving and aligning the fiber stub 28 and the adjoining optical fiber 18 within the connector 10. Also, although only one alignment groove 32 has been illustrated, it will be apparent to a person skilled in the art that the connector 10 may be provided with a plurality of alignment grooves as in 32 to accommodate a dual-fiber or multi-fiber connector having two (2) or more fiber stubs as in 28.

Still referring to FIG. 2A and FIG. 2B, the connector housing 12 illustratively has mounted therein and extending towards the groove 32 a first mechanical splice anvil 36 used to maintain the fiber stub 28 and the optical fiber (reference 18 in FIG. 1) in alignment as well as a second mechanical splice anvil 38 positioned adjacent the first anvil 36 and used to exert pressure on the buffered portion 22 and on the bare fiber 18, as will be discussed in further detail herein below. Illustratively, the anvils 36 and 38 are positioned in abutment with an inner surface of the sliding lock 24 adjacent the groove 32, with a clamping surface (not shown) of the anvil 36 overlapping the stub splicing face and the optical fiber splicing face of the adjoining fiber 18 and fiber stub 28. The ferrule holder 30 is further provided with a plurality of spaced projections or bosses as in 40 arranged along an outer surface thereof. The projections as in 40 illustratively cooperate with apertures or holes as in 42 spaced by ribs 44 provided on an outer surface of the sliding lock 24, thus behaving as a clamping mechanism suitable for urging the anvils as in 36 and 38 against the adjoining fiber stub 28 and optical fiber 18, as will be discussed further herein below. For this purpose, the sliding lock 24 is slideably mounted about the ferrule holder 30 and is displaceable along the longitudinal axis X (i.e. along directional arrow B) from a released position (illustrated in FIG. 2A), in which no pressure is applied on the anvils 36 and 38 and the fiber 18 can be freely inserted into the rear of the connector 10 along the groove 32, to a clamping position (illustrated in FIG. 2B), in which pressure is applied on both anvils 36 and 38.

Referring now to FIG. 3A, FIG. 3B, FIG. 4A and FIG. 4B, the optical fiber 18 is illustratively inserted into the connector 10 and guided along the groove 32 with the sliding lock 24 in the released position. In this position, the holes as in 42 are in alignment with the projections as in 40 and accordingly each rib 44 is positioned in a corresponding slot (not shown) between a respective pair of projections as in 40. Thus, room is provided between the anvils 36 and 38 and the internal surface of the ferrule holder 30 for insertion of the fiber 18 into the connector 10 along the direction of arrow A (FIG. 1). Once the fiber 18 has been guided through the second groove portion (reference 34$_2$ in FIG. 1) into the alignment groove 32, the fiber 18 is advanced freely into the connector 10 until it reaches a final centered position (illustrated in FIG. 4A and FIG. 4B), in which the optical fiber splicing face of the fiber 18 comes into physical contact with the adjoining stub splicing face of the fiber stub 28.

Figure 5B:
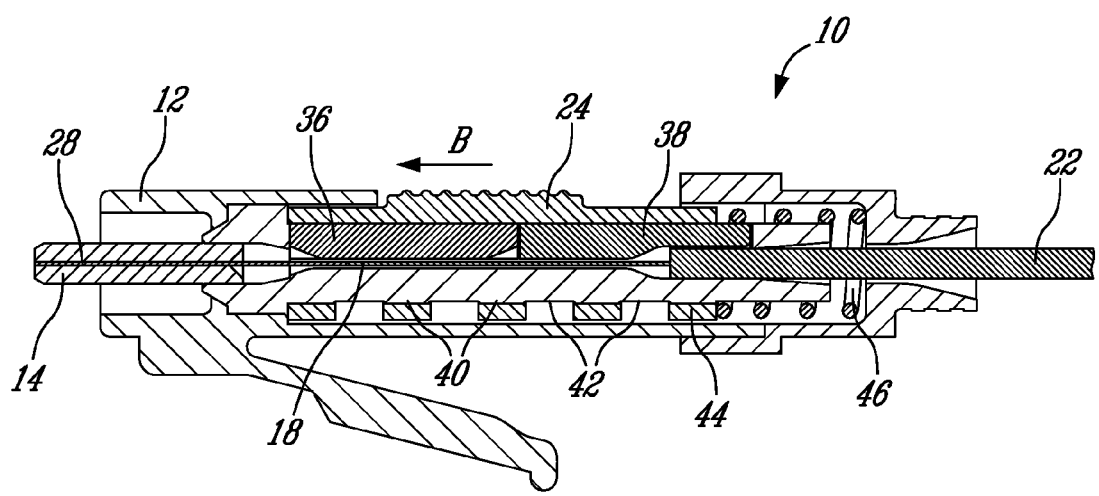
FIG. 5B is a front side view of the reversible fiber connector of FIG. 5A in accordance with an illustrative embodiment of the present invention.

Referring now to FIG. 5A and FIG. 5B, once the fiber 18 is in the final position, the sliding lock 24 is moved to the clamping position, in which the projections as in 40 of the ferrule holder 30 are out of alignment with the holes as in 42 of the sliding lock 24 and each rib 44 of the sliding lock 24 is moved out of the corresponding slot (not shown) and positioned opposite a corresponding projection 40 for interference therewith. As a result, the inner surface of the sliding lock 24 is moved in a direction perpendicular to the longitudinal axis (reference X in FIG. 2A) and displaces both splice anvils 36 and 38 accordingly. The clamping surfaces of the anvils 36 and 38 thus exert a clamping force on the fibers 18 and 28, which are thereby compressed to better retain the fibers 18 and 28 in alignment relative to one another within the groove 32. The optical fiber 18 is thus more accurately terminated and the connector 10 can subsequently be mated to an appropriate port (not shown) or other connector (not shown). A spring 46 illustratively provides compressive resistance behind the ferrule 14, thus ensuring adequate contact pressure between the ferrule 14 and a contact point on the port.

Still referring to FIG. 5A and FIG. 5B and according to an alternative illustrative embodiment of the present invention, the width of the slots (not shown) provided between the projections as in 40 (i.e. the spacing between the projections as in 40) may either be substantially the same (as illustrated in FIG. 5A and FIG. 5B) or set to vary along the length of the ferrule holder 30 such that when the sliding lock 24 is moved to the clamping position, the anvils 36, 38 are not displaced at the same time. For example, the slots between the projections as in 40 provided adjacent the anvil 36 may have a smaller width than the slots provided adjacent the anvil 38. In this manner, when the sliding lock 24 is moved towards the ferrule holder 30, only the ribs as in 44 adjacent the anvil 36 are moved out of their corresponding slot while the ribs as in 44 adjacent the anvil 38 are still retained within their corresponding slot. As a result, only the anvil 36 is displaced downwardly into the clamping position described herein above whereas the anvil 38 remains in the released position. Alternatively, it may be desirable to move the anvil 38 to the clamping position first while the anvil 36 remains in the released position and in this case, the slots between the projections as in 40 provided adjacent the anvil 36 may be illustratively designed to have a greater width than the slots provided adjacent the anvil 38.

Referring back to FIG. 1, the termination mechanism of the present invention has the advantage of being simple as well as nondestructively reusable. This is effected by returning the sliding lock 24 to the original released position (by sliding the lock 24 away from the ferrule 14 in a direction opposite to that of arrow B in FIG. 5B), thus releasing clamping forces on both the optical fiber 18 and the fiber stub 28. The optical fiber 18 may then be withdrawn from the connector 10 (after having been terminated) and subsequently reinserted for another attempt at a successful connection in the event where optical continuity between the fibers 18 and 28 has been deemed unacceptable. The connector 10 therefore eliminates the need for any extra and irreversible operation to crimp a lead-in tube or annular crimp ring about the buffered portion 22 of the fiber cable 20 and provide strain relief to the interface of the aligned field and fiber stubs 18 and 28, as is the case of conventional connectors. As the crimp is destructive, such crimping typically degrades the fiber interface and such degraded connection cannot be improved short of cutting away the wasted connector, re-stripping and re-cleaving the optical fiber as in 18, and re-terminating the optical fiber as in 18 with a new fiber stub as in 28 in a new connector.

In addition and still referring to FIG. 1, the assembly of the present invention is advantageously adaptable to various types of fiber connectors, such as fiber connectors conformed to the Straight Tip (ST), Standard Connector (SC), or hybrid fiber and electrical contact standards. Moreover, the use of two (2) anvils as in 36 and 38 enables to more accurately control the termination of the optical fiber 18 as pressure may be simultaneously applied on the buffered portion 22 and the length of the fiber 18 (by anvil 38) as well as on the mating region (by anvil 36), thus better aligning and retaining the fibers 18 and 28 within the connector 10.

Although the present invention has been described hereinabove by way of specific embodiments thereof, it can be modified, without departing from the spirit and nature of the subject invention as defined in the appended claims.

What is claimed is:

1. A connector assembly for reversibly terminating an optical fiber, the assembly comprising an elongate housing comprising a front end, a rear end and a cavity extending therebetween along a longitudinal axis, the assembly comprising:

an elongate member mounted within the cavity and comprising a first end, a second end and an alignment groove extending along a first surface thereof between said first end and said second end, wherein an end portion of the optical fiber is positioned within said groove and extending from said second end, wherein an optical fiber splicing face of the optical fiber is positioned between said first end and said second end;

an optical fiber stub positioned within said groove and extending from said first end, wherein a stub splicing face of said optical fiber stub is positioned opposite said optical fiber splicing face;

a splice anvil positioned adjacent said first surface, a clamping surface of said anvil overlapping said stub splicing face and said optical fiber splicing face; and a clamping mechanism comprising a plurality of spaced projections arranged along a second surface of said elongate member opposite said first surface and an actuator slideably mounted about said elongate member for movement between a released position and a clamping position, said actuator comprising an inner surface abutting said anvil and a plurality of spaced ribs, wherein when in said released position each of said ribs is positioned in a corresponding slot between a respective pair of said projections and wherein when said actuator is moved from said released position to said clamped position each of said ribs is moved out of said corresponding slot and positioned opposite a corresponding one of said projections, said movement giving rise to a corresponding movement of said inner surface, said inner surface displacing said anvil in a direction perpendicular to the longitudinal axis and towards said first surface, a clamping surface of said anvil bringing a corresponding clamping force to bear on said optical fiber stub and the optical fiber.

2. The connector assembly of claim 1, further comprising a ferrule comprising a front face, a rear end positioned adjacent said first end of said elongate member, an axial bore aligned with said groove, wherein said optical fiber stub is disposed in said bore and extends from said front face into said groove.

3. The connector assembly of claim 2, wherein said elongate member is a ferrule holder.

4. The connector assembly of claim 1, wherein when in said released position, said clamping surface and said first surface are spaced for enabling said positioning of said end portion of the optical fiber and of said optical fiber stub within said groove.

5. The connector assembly of claim 4, wherein said groove comprises adjacent said first end of said elongate member a first groove portion for guiding said positioning of said optical fiber stub within said groove and said groove comprises adjacent said second end a second groove portion for guiding said positioning of said end portion of the optical fiber within said groove.

6. The connector assembly of claim 5, wherein said groove is substantially V-shaped and said first and said second groove portions are substantially funnel-shaped.

7. The connector assembly of claim 1, wherein said actuator is moveable from said released position to said clamped position by sliding said actuator about said elongate member along the longitudinal axis towards said first end, and further wherein said actuator is moveable from said clamped position back to said released position for reversibly terminating the optical fiber by sliding said actuator about said elongate member along the longitudinal axis towards said second end.

8. The connector assembly of claim 1, further comprising a second splice anvil positioned along the longitudinal axis adjacent said splice anvil and adjacent said first surface, a clamping surface of said second anvil overlapping said end portion of the optical fiber positioned within said groove.

9. The connector assembly of claim 8, wherein the optical fiber comprises a bare fiber coated by a buffered portion, and further wherein at said end portion said buffered portion is removed to expose said bare fiber, said clamping surface of said second anvil overlapping both said bare fiber and said buffered fiber.

10. The connector assembly of claim 8, wherein said inner surface of said actuator abuts said second anvil and further wherein when said actuator is moved to said clamped position, said inner surface displaces said second anvil in said direction perpendicular to the longitudinal axis and towards said first surface, a clamping surface of said second anvil bringing a corresponding second clamping force to bear on said end portion of the optical fiber.

11. A method for reversibly terminating an optical fiber to an optical fiber stub, the method comprising:
   providing a connector assembly comprising
      an elongate housing comprising a front end, a rear end and a cavity extending therebetween along a longitudinal axis;
      an elongate member mounted within said cavity and comprising a first end, a second end and an alignment groove extending along a first surface thereof between said first end and said second end;
      a splice anvil positioned adjacent said first surface; and
      a clamping mechanism comprising a plurality of spaced projections arranged along a second surface of said elongate member opposite said first surface and an actuator slideably mounted about said elongate member for movement between a released position and a clamping position, said actuator comprising an inner surface abutting said anvil and a plurality of spaced ribs, wherein when in said released position each of said ribs is positioned in a corresponding slot between a respective pair of said projections;
   positioning an end portion of the optical fiber within said groove, said end portion extending from said second end and an optical fiber splicing face of the optical fiber being positioned between said first end and said second end;
   positioning the optical fiber stub within said groove, the optical fiber stub extending from said first end, a stub splicing face of the optical fiber stub being positioned opposite said optical fiber splicing face, and a clamping surface of said anvil overlapping said stub splicing face and said optical fiber splicing face; and
   moving said actuator from said released position to said clamped position, thereby moving each of said ribs out of said corresponding slot and positioning each of said ribs opposite a corresponding one of said projections, said movement giving rise to a corresponding movement of said inner surface, said inner surface displacing said anvil in a direction perpendicular to the longitudinal axis and towards said first surface, a clamping surface of said anvil bringing a corresponding clamping force to bear on the optical fiber stub and the optical fiber.

12. The method of claim 11, wherein said connector assembly comprises a ferrule comprising a front face, a rear end positioned adjacent said first end of said elongate member, an axial bore aligned with said groove, and further wherein positioning the optical fiber stub comprises disposing the optical fiber stub in said bore, the optical fiber stub extending from said front face into said groove.

13. The method of claim 11, wherein said moving said actuator from said released position to said clamped position comprises sliding said actuator about said elongate member along the longitudinal axis towards said first end.

14. The method of claim 13, further comprising moving said actuator from said clamped position back to said released position for reversibly terminating the optical fiber by sliding said actuator about said elongate member along the longitudinal axis towards said second end.

15. The method of claim 11, further comprising providing a second splice anvil and positioning said second splice anvil along said longitudinal axis adjacent said splice anvil and adjacent said first surface, a clamping surface of said second anvil overlapping said end portion of the optical fiber and an inner surface of said actuator abutting said second anvil.

16. The method of claim 15, wherein the optical fiber comprises a bare fiber coated by a buffered portion, and further wherein the method comprises, prior to said positioning said end portion of the optical fiber within said groove, removing at said end portion said buffered portion to expose said bare fiber.

17. The method of claim 16, wherein said clamping surface of said second anvil overlaps both said bare fiber and said buffered fiber.

18. The method of claim 15, wherein when said actuator is moved to said clamped position, said inner surface displaces said second anvil in said direction perpendicular to the longitudinal axis and towards said first surface, a clamping surface of said second anvil bringing a corresponding second clamping force to bear on said end portion of the optical fiber.

\* \* \* \* \*